INVENTOR.
Gernot Brueckner
BY Dicke & Craig
ATTORNEYS

Aug. 24, 1965                G. BRÜCKNER                3,201,826
           APPARATUS FOR STRETCHING STRIPS OF PLASTIC MATERIAL
Filed Dec. 3, 1962                                 2 Sheets-Sheet 2

INVENTOR.
Gernot Brueckner
BY Dicke & Craig
ATTORNEYS

United States Patent Office 3,201,826
Patented Aug. 24, 1965

3,201,826
APPARATUS FOR STRETCHING STRIPS OF
PLASTIC MATERIAL
Gernot Brückner, Laufener Strasse 12, Tittmoning,
Upper Bavaria, Germany
Filed Dec. 3, 1962, Ser. No. 241,779
Claims priority, application Germany, Dec. 7, 1961,
B 65,082
6 Claims. (Cl. 18—1)

The present invention relates to an apparatus for stretching flexible strips of organic plastic materials by subjecting the heated strip in its longitudinal direction to a traction which is produced by two groups of rollers rotating at different speeds.

Materials of the mentioned type, for example, thermoplastic sheeting, are conventionally stretched between two groups of rollers, the second of which runs at a higher peripheral speed than the first so that due to this difference in speed the material is stretched in its longitudinal direction. For being stretched, the strip is heated either by heated rollers, by blowing hot air thereon, or by radiation from heating elements. This method has the disadvantage that, while being stretched, the plastic strip shrinks in width so that its final width is narrower than its original width before being stretched. The stretching operation therefore not only affects the thickness of the material, but also its width. A further disadvantage of this method is that the thickness of the plastic material when stretched is greater near its edges than near its center.

The effects which were made in the past to overcome these disadvantages consisted solely of carrying out the stretching operation by passing the material through a narrow gap between the rollers, by drawing it over curved guide rods, or by heating the edge portions of the strip to a lower temperature than the central part thereof.

It is an object of the present invention to overcome the mentioned disadvantages completely and much more effectively than has been previously possible. This is attained according to the invention by pressing the lateral edge portions of the plastic sheet material during the stretching operation upon a preferatably rotatable support and by thus maintaining its original width. No shrinking in width will therefore occur and there will thus also be no need for any subsequent efforts to stretch any shrunk portions of the material to regain the original width. Since the edges of stretched plastic strips are usually cut off, it is also possible to exert the pressure upon the strip at a short distance from its edges. Another important feature of the invention consists in cooling the material while being held at its desired width or immediately thereafter so that it will freeze or set at this width and thus will no longer have any opportunity to shrink.

Another feature of the invention consists in the provision of an apparatus for carrying out the inventive method which comprises a separate roller, hereafter called a marginal pressure roller, for pressing the plastic strip near each edge threof upon a common counter-roller, which forms the first reversing roller of the group of stretching rollers running at a higher speed, or upon a separate common arcuate roller. The invention may also be modified by associating each marginal pressure roller with a separate counterroller.

Another preferred feature of the invention consists in mounting the marginal pressure rollers at an inclined position relative to each other so that the axes of these rollers intersect at a point spaced from their actual points of rotation in the direction in which the material is drawn.

In order to cool and set the material quickly after it has been stretched and its desired width has been attained, the first reversing roller or the marginal pressure roller acting upon the first reversing roller or both may be water-cooled. According to another feature of the invention, means may also be provided for cooling the material with air behind the marginal pressure rollers. Such cooling has the great advantage that the material after being heated and before cooling will not come into contact with any rollers which could possibly damage the surface of the material.

In order to increase the gripping action of the marginal pressure rollers, they may be provided with an elastic covering for example, of rubber.

The apparatus with means for adjusting the distance between the associated rollers of the stretching mechanism and for varying the position of the heating and cooling means and the position of the marginal pressure rollers bettween the rollers of the stretching mechanism, as well as the distance of the marginal rollers from each other.

The above-mentioned features and advantages of the present invention will become more clearly apparent from the following detailed description threof which is to be read with reference to the accompanying diagrammatic drawings, in which:

FIGURE 7 shows a top view of the marginal pressure roller according to FIGURE 6; while

Figure 1:
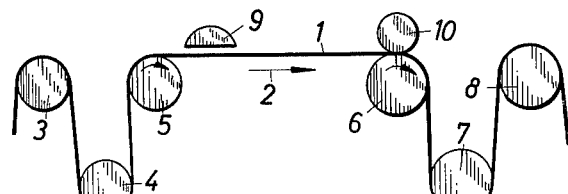
FIGURE 1 shows a side view of a stretching apparatus which is provided with marginal pressure rollers for pressing the material upon a rotatable support so as to maintain the material at a prescribed width.
Figure 2:
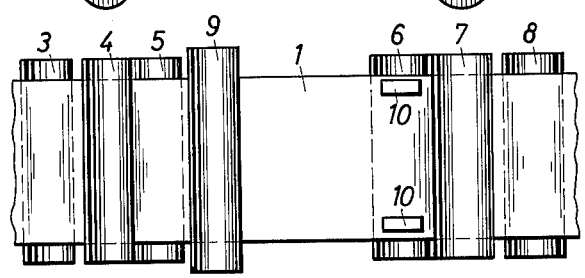
FIGURE 2 shows a top view of the apparatus according to FIGURE 1.

In the stretching apparatus as illustrated in FIGURES 1 and 2, the plastic strip 1 runs successively over the rollers 3 to 8 in the direction as indicated by the arrow 2. Rollers 3 to 5 are driven at a certain speed and rollers 6 to 8 at a higher speed so that the plastic strip 1 will be stretched between the rollers 5 and 6. In order to effect the stretching operation, it is necessary to heat the plastic strip which is preferably done by means of radiation from an electric radiator 9. In order to prevent the plastic strip 1 from shrinking in width, two pressure rollers 10 are provided which press the edge portions of strip 1 against the roller 6. Roller 6 is preferably water-cooled so that the plastic strip will quickly set at the desired width as soon as it has been worked upon by the marginal pressure rollers 10.

Figure 3:
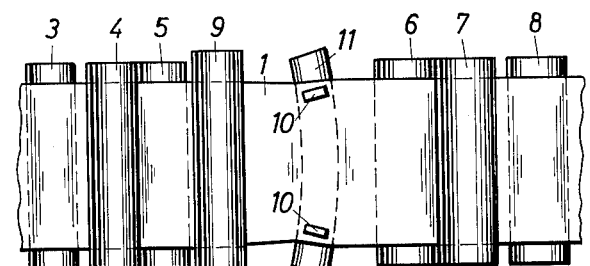
FIGURE 3 shows a top view similar to FIGURE 2 of a stretching apparatus in which the marginal pressure rollers for maintaining the width of the material act upon an arcuate roller.

Instead of employing the roller 6 as a rotary support for the pressure rollers 10, as illustrated in FIGURES 1 and 2, it is also possible to provide for this purpose an arcuate roller 11 as shown in FIGURE 3 which is mounted between the rollers 5 and 6 which are equally inclined to the direction of movement of strip 1 so that their axes intersect at a point which is located within a substantially central vertical plane of strip 1 and at a certain distance from a straight line connecting their centers of rotation in the direction toward the axis of roller 6.

Figure 4:
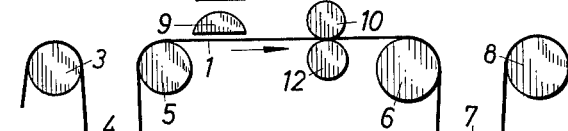
FIGURE 4 shows a side view of a stretching apparatus in which each marginal pressure roller for maintaining the width of the material acts upon a separate counter-roller.
Figure 5:
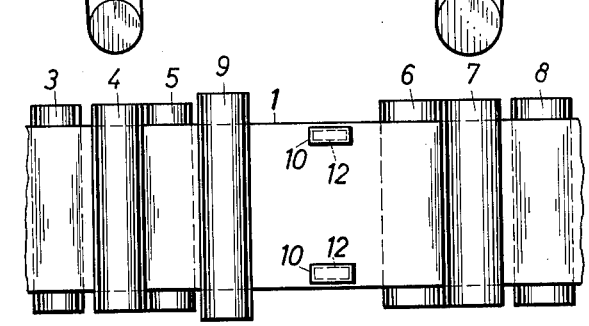
FIGURE 5 shows a top view of the apparatus according to FIGURE 4.
Figure 6:
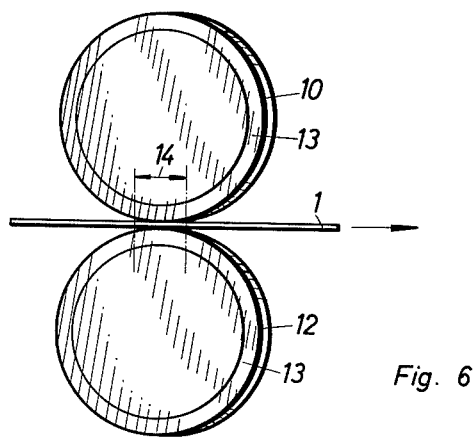
FIGURE 6 shows a side view on a larger scale of an inclined marginal pressure roller which is provided with a layer of rubber and acts upon a similar counter-roller.
Figure 7:
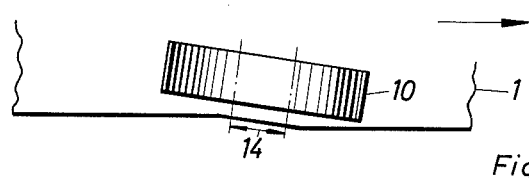

In the apparatus according to FIGURES 4 and 5, each marginal pressure roller 10 is associated with a separate counterroller 12 to press the plastic strip 1 thereon. Rollers 10 as well as rollers 12 of this apparatus may be inclined as described with reference to rollers 10 in FIGURE 3, and, as shown in FIGURE 6, both sets of rollers 10 and 12 are preferably provided with a covering 13 of rubber in order to increase the gripping action of these rollers upon the plastic strip 1. As indicated in FIGURE 6, the rubber covering 13 is compressed within the area 14 between the two associated rollers 10 and 12. Within this area 14 the plastic strip 1 is gripped and drawn laterally, as indicated in FIGURE 7. By a suitable adjustment of the inclination of the rollers it is possible to draw the plastic strip 1 outwardly to such an extent that its original width will be reattained.

Figure 8:
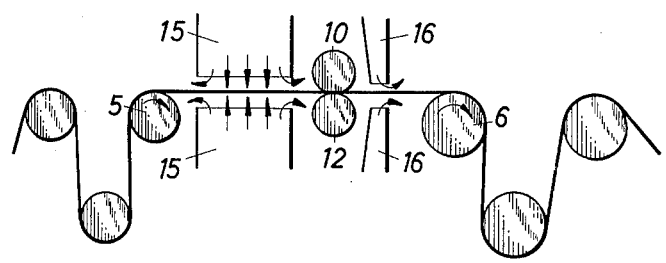
FIGURE 8 shows a side view of an apparatus in which behind the marginal pressure rollers for maintaining the material at the desired width a device is provided for blowing cooling air upon the material.

FIGURE 8 finally shows an apparatus in which the plastic strip 1 is heated between the rollers 5 and 6 and before reaching the pressure rollers 10, 12 by means of hot air which is blown upon both sides of the plastic strip through channels 15, and in which it is cooled behind the rollers 10, 12 by cold air which is blown thereon through nozzles 16.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An apparatus for stretching plastic sheet material in the longitudinal direction comprising two stretching rolls parallel to and spaced from each other, the second roll being driven at a higher speed than the first roll so as to exert a longitudinal traction upon the sheet material running over said stretching rolls, means for heating said sheet material between said stretching rolls, a rotatable support, and at least one pair of pressure rolls between said stretching rolls and following said heating means for pressing the marginal parts of said sheet material against said rotatable support, said pressure rolls being inclined relative to each other so that their axes intersect at a certain distance from a straight line connecting the centers of rotation of said pressure rolls in the direction of movement of said sheet material.

2. An apparatus as defined in claim 1, in which said rotatable support for said pressure rolls consists of an arcuate roll.

3. An apparatus as defined in claim 1, in which said rotatable support consists of a pair of counterrolls, each associated with one of said pressure rolls.

4. An apparatus as defined in claim 1, in which said pressure rolls are water-cooled.

5. An apparatus as defined in claim 1, further comprising means for adjusting the distance of said pressure rolls relative to each other.

6. An apparatus as defined in claim 1, further comprising means for adjusting the location of said pressure rolls relative to said stretching rolls.

References Cited by the Examiner

UNITED STATES PATENTS

| | | |
|---|---|---|
| 2,034,716 | 3/36 | Dreyfus. |
| 2,461,376 | 2/49 | Feldmeier _____ 26—65 |
| 2,547,736 | 4/51 | Blake _____ 264—288 |
| 2,547,763 | 4/51 | Land et al. _____ 264—288 |
| 2,804,652 | 9/57 | Balkan _____ 264—289 |
| 2,854,697 | 10/58 | Ryan. |
| 2,916,767 | 12/59 | Stevens. |

FOREIGN PATENTS

| | | |
|---|---|---|
| 1,111,894 | 11/55 | France. |
| 473,222 | 10/37 | Great Britain. |
| 780,590 | 8/57 | Great Britain. |

WILLIAM J. STEPHENSON, *Primary Examiner.*

ALEXANDER H. BRODMERKEL, *Examiner.*